United States Patent
Sezan

(10) Patent No.: US 6,845,176 B1
(45) Date of Patent: Jan. 18, 2005

(54) SYSTEM AND METHOD FOR ON-LINE COMPUTATION AND STORAGE OF SCENE HISTOGRAMS IN AN IMAGE ACQUISITION APPLIANCE

(75) Inventor: M. Ibrahim Sezan, Camas, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 1143 days.

(21) Appl. No.: 09/040,510

(22) Filed: Mar. 17, 1998

(51) Int. Cl.[7] .................................................. G06K 9/00
(52) U.S. Cl. ...................................... 382/168; 382/305
(58) Field of Search ................................ 382/236, 250, 382/299, 248, 168–172; 348/222–229, 231, 699, 700; 358/522, 506; 707/1–6, 104.1

(56) References Cited

U.S. PATENT DOCUMENTS

| | | | |
|---|---|---|---|
| 4,606,065 A | | 8/1986 | Beg et al. |
| 4,636,845 A | * | 1/1987 | Alkofer ....................... 358/80 |
| 4,677,465 A | * | 6/1987 | Alkofer ...................... 358/506 |
| 4,742,551 A | | 5/1988 | Deering |
| 4,755,889 A | * | 7/1988 | Schwartz ..................... 360/32 |
| 4,855,825 A | * | 8/1989 | Sanntamaki et al. ........ 348/415 |
| 5,150,433 A | * | 9/1992 | Daly ........................... 382/250 |
| 5,233,417 A | * | 8/1993 | Nouso ......................... 348/208 |
| 5,291,298 A | * | 3/1994 | Senuma et al. ............. 358/310 |
| 5,339,166 A | | 8/1994 | LeBrat et al. |
| 5,521,841 A | | 5/1996 | Arman et al. |
| 5,606,655 A | | 2/1997 | Arman et al. |
| 5,635,982 A | * | 6/1997 | Zhang ......................... 348/231 |
| 5,646,750 A | * | 7/1997 | Collier ....................... 358/518 |
| 5,751,846 A | * | 5/1998 | Higgins-Luthman et al. .......................... 382/169 |
| 5,959,696 A | * | 9/1999 | Hwang ....................... 348/678 |

OTHER PUBLICATIONS

Manal et al., Image Indexing using moments and wavelets, IEEE ISSN: 0098–3063, 557–565.*
Pass et al., Histogram Refinement for Content–Based Image Retrieval, IEEE 0–8186–7620.*
R. L. Lagendijk et al. "Visual Search in A SMASH System," Proceedings of the IEEE ICIP96 Conference, pp. 671–674, Lausanne, Switzerland, 1996.
B. Yeo and B. Liu, "Rapid scene analysis on compressed video," IEEE Trans. On Circuits and Systems for Video Technology, vol. 5, No. 6, 1995.

* cited by examiner

Primary Examiner—Leo Boudreau
Assistant Examiner—Ishrat Sherali
(74) Attorney, Agent, or Firm—Robert D. Varitz, P.C.

(57) ABSTRACT

A video image processing system includes an image sensor for sensing an image and generating an image signal therefor; and a histogram computation mechanism for generating, on-line, a histogram from said image signal.

A method of analyzing a video image includes sensing an image; generating an image signal therefor; and computing, on-line, a histogram for the image from the image signal.

26 Claims, 4 Drawing Sheets

SYSTEM AND METHOD FOR ON-LINE COMPUTATION AND STORAGE OF SCENE HISTOGRAMS IN AN IMAGE ACQUISITION APPLIANCE

FIELD OF THE INVENTION

This invention relates to on-line computation of color (intensity) histograms during image capture or acquisition in an imaging appliance and storage of histograms in the imaging appliance, and specifically to a system and method using an image recording device, i.e., a still or video camera, where color histograms are computed on-line during image acquisition, and where the computed histograms are stored in the image recording device.

BACKGROUND OF THE INVENTION

Use of color histograms to perform image and video analysis for database applications is common place. A histogram is an array of value-versus-count, where "count" contains the number of occurrence of that particular "value". In the case of image intensity histogram, "value" is the pixel value and "count" is the number of pixels in the image attaining that value. Histograms of separate color channels may also be computed in a similar fashion. Histograms of separate color channels may be concatenated into a single color histogram array. Histograms of DC coefficients of block DCT (Discrete Cosine Transform) of images may also be calculated, where value equals the DC value and count is the number of blocks with the same DC value.

A histogram, or a set of statistics of the histogram, e.g., the first three orders of statistics, are often used as image feature descriptors in analyzing and representing the associated images. In video analysis, histograms are used to compute scene changes, video summaries. In image analysis, color feature of the image is described via its color histogram. In that case, for example, a color image may be represented by nine numbers corresponding to the first three orders of statistics per each color channel histogram, or a set of three histograms themselves. Histograms are often used in image and video analysis. Histogram computation may present a computational bottleneck.

None of the prior art discloses a camera that has on-line computation and storage capability for image histograms, or a system employing such a camera that is capable of quick analysis of image content.

U.S. Pat. No. 4,606,065 to Beg et al. describes an image processing system that includes a 'histogram mode' wherein locations in a memory circuit function as sorting bins.

U.S. Pat. No. 4,742,551 to Deering describes a mechanism for computing grey-scale histograms.

U.S. Pat. No. 5,339,166 to LeBrat et al. describes an image classification system based which calculates histograms to determine scene motion.

U.S. Pat. No. 5,521,841 to Arman et al. describes a video browser that is shape-dependent.

U.S. Pat. No. 5,606,655 to Arman et al. describes a method for determining a representative frame taken from a group of frames.

R. L. Lagendijk et al. "Visual Search in A SMASH System," Proceedings of IEEE ICIP$_{96}$ Conference, pp. 671–674, Lausanne, Switzerland, 1996.

B. Yeo and B. Liu, "Rapid scene analysis on compressed video," IEEE Trans. On Circuits and Systems for Video Technology, vol. 5, no. 6, 1995.

SUMMARY OF THE INVENTION

A video image processing system includes an image sensor for sensing an image and generating an image signal therefor; and a histogram computation mechanism for generating, on-line, a histogram from said image signal.

A method of analyzing a video image includes sensing an image; generating an image signal therefor; and computing, on-line, a histogram for the image from the image signal.

The system and method of the invention are applicable to video and still imaging systems.

An object of the invention is to provide for on-line color histogram computation.

Another object of the invention is to provide for histogram computation during image acquisition.

These and other objects and advantages of the invention will become more fully apparent as the description which follows is read in conjunction with the drawings.

DETAILED DESCRIPTION OF THE PREFERRED EMBODIMENTS

Color is often a distinctive characteristic of an image and is used as an image feature described by a color-histogram. Color histograms are commonly used in quick and effective analysis of video. For example, color histograms are widely used in detecting shot boundaries and in reconstructing video summaries by detecting the most representative frames in a video sequence. Differences in contents of successive frames may be effectively represented, in many cases, by difference measures defined in terms of their respective color histograms. However, computation of color histograms may correspond to a significant portion of the total processing time required. In the prior art, in implementation of the method of video summarization, color histogram computation takes about ten times as much computational time than the rest of the summarization process.

To save storage space needed to store the histograms and computational complexity in subsequent computational procedures that make use of the histogram, the value may be quantized to a coarser scale. Also, only a subset of pixels may be considered in computing the count. Instead of storing histograms themselves, only their sample statistics (e.g., mean, variance and skewness) may be stored and used. If a histogram is computed and stored on-line, in a way transparent to the user, computational efficiency of post-processing that utilize histograms will increase. This invention relieves the post-processing application from computing the histograms. For instance, given a video camera containing embedded video summarization software, and on-line computed and stored histograms, the user may activate a "summarize" functionality to directly utilize the readily available histograms and compute a summary of the recorded content in terms of its most representative frames and visualize the summary on camera display and store it for future use in quick identification of video content or for indexing and annotation for storage in a database.

Figure 1:
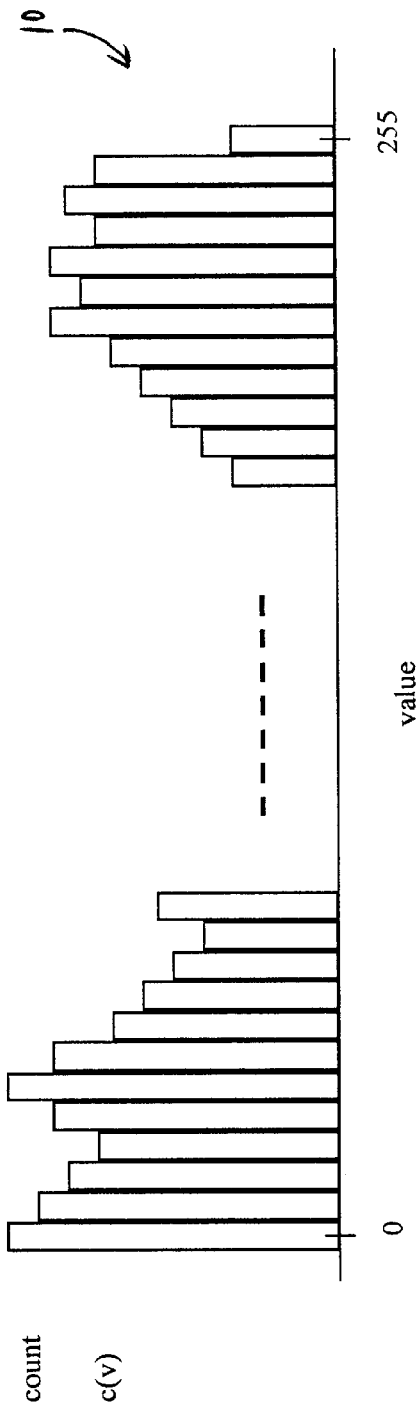
FIG. 1 is an example of a histogram having values quantized to 256 different possible values.
Figure 2:
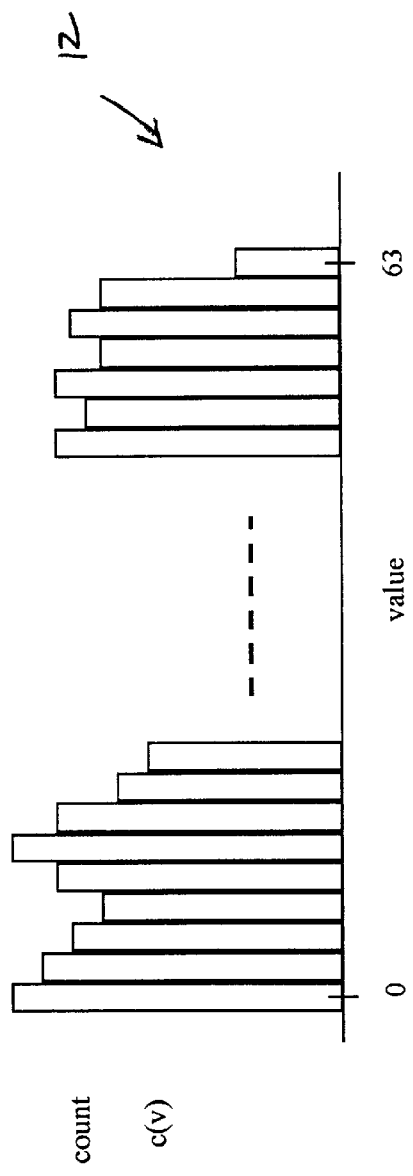
FIG. 2 is an example of a histogram having values quantized to 64 different possible values.

Referring now to FIG. 1, a portion of a histogram 10 is depicted for values which are quantized to 256 different possible values, e.g., this is an image intensity histogram for an 8-bit image. FIG. 2 shows a similar histogram 12 quantized to 64 possible values, e.g., an image intensity histogram for a 6-bit image. Both histograms 10 and 12 are what are referred to herein as "full scale histograms."

Figure 3:
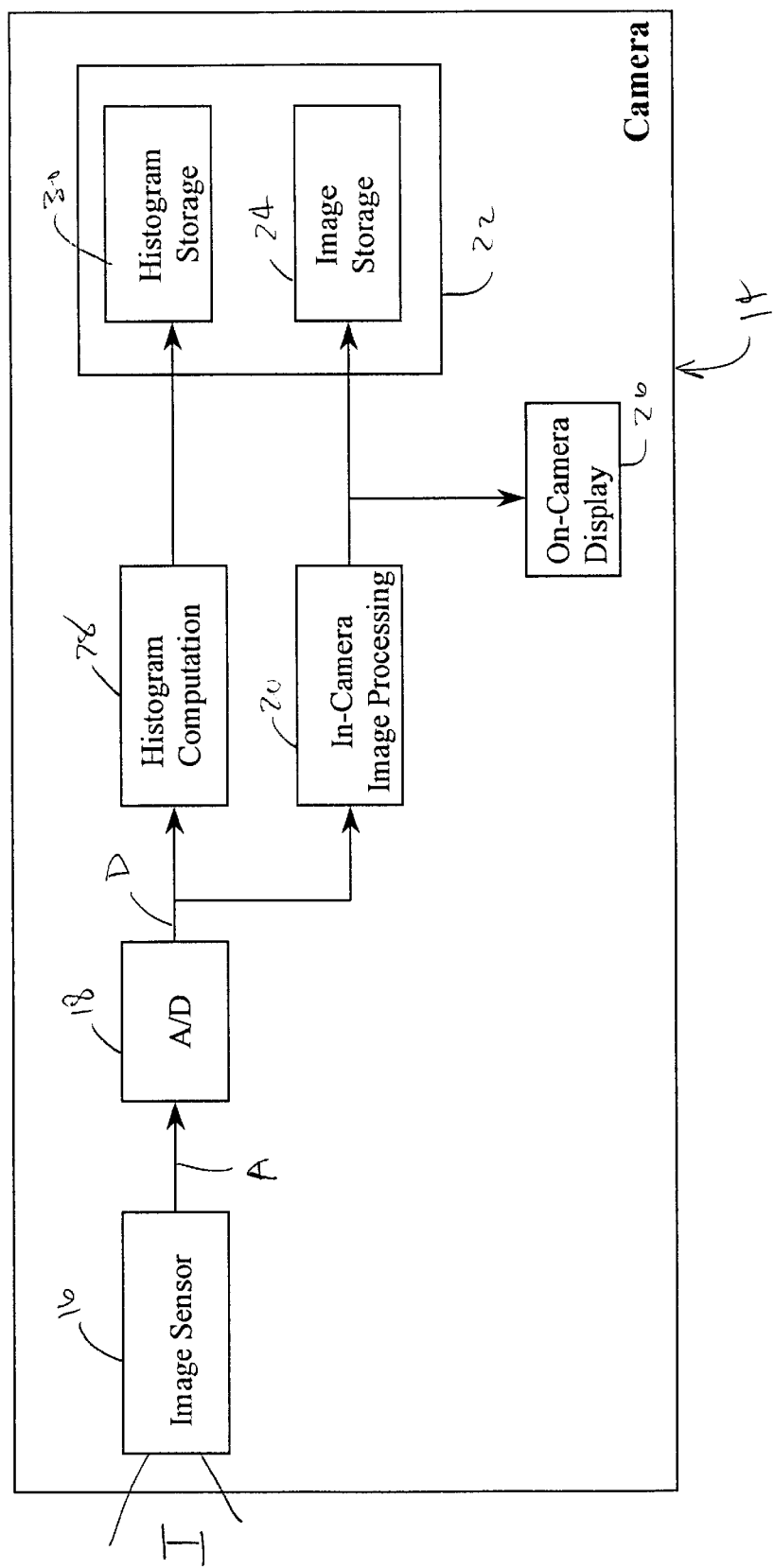
FIG. 3 is a block diagram of an image acquisition device constructed according to the invention.

An image acquisition device is shown in FIG. 3 at 14. Device, or camera, 14 includes an image sensor 16, which generates an analog image signal, A, representative of a sensed image, I, and an analog-to-digital converter 18, which converts analog image signal A into a digital image signal D. Camera 14 also includes a conventional in-camera image processing mechanism 20 for processing signal D. A storage mechanism 22 is provided, which may take the form of a video tape or other storage media, such as optical disc, flash memory in a video cassette, e.g., memory-in-cassette (MIC) in a DVC cassette, or in flash memory in a camera 14, e.g., in an analog video camera. Image and related data may also be stored on conventional photographic film. The processed image signal from mechanism 20 is stored in an image storage mechanism 24 of storage mechanism 22, and may also be displayed by an optional on-camera display 26.

Simultaneously with image processing, on-line histogram computation occurs, block 28, in camera 14. Histograms are computed from signal D. The computed histograms are stored in histogram storage mechanism 30 of storage mechanism 22, which may be any of the varieties of memory described in connection with image storage mechanism 22. As used herein, "on-line" means that the histograms are computed in real time as the image is acquired or captured, eliminating the need for such computation during post-processing.

Such computation is, in general, less costly compared to other usual signal and image processing that is performed in the camera and hence, does not hinder the usual camera performance. Information, e.g., a table, linking histograms with their associated images are also recorded and made available to subsequent post-processing procedures.

The following equations represent the first three moments, i.e., "sample statistics" of full scale histogram c(v), as shown in FIGS. 1 and 2, where N is the total number of different possible values.

$$m_1 = 1/N \Sigma_v c(v)$$

$$m_2 = (1/N \Sigma_v (c(v)-m_1)^2)^{1/2}$$

$$m^3 = (1/N \Sigma_v (c(v)-m_1)^3)^{1/3}$$

If color histograms are computed on-line during image acquisition via in-camera hardware/software and stored along with the associated image information in the camera, the user application does not have to be burdened by downloading the images to a host platform, e.g., a personal computer (PC), and computing their color histograms before further processing the images. The computed histograms may be readily available to the user application. Thus, a quick analysis of the content is possible without the need for downloading images by accessing them one-by-one, and computing their histograms. This will result in time savings as well as reduced memory requirements for the host platform. For example, a summary of the video may be quickly computed using the histograms. Given the histogram of the most representative frames that constitute the summary and the information about which frames the histograms are associated with, the summary may be visually presented to the user by downloading only those frames that are contained in the summary. Then, the user may only download, for instance, the interesting segments of the video suggested by the summary.

In the above-described process, only the first three order statistics: 1st order moment (mean), 2nd order moment (variance), and third order moment, as shown by the equations, above, may be computed and stored. This provides savings in storage because three statistics for each one of the three color channel results in a total number of nine numbers only.

Figure 4:
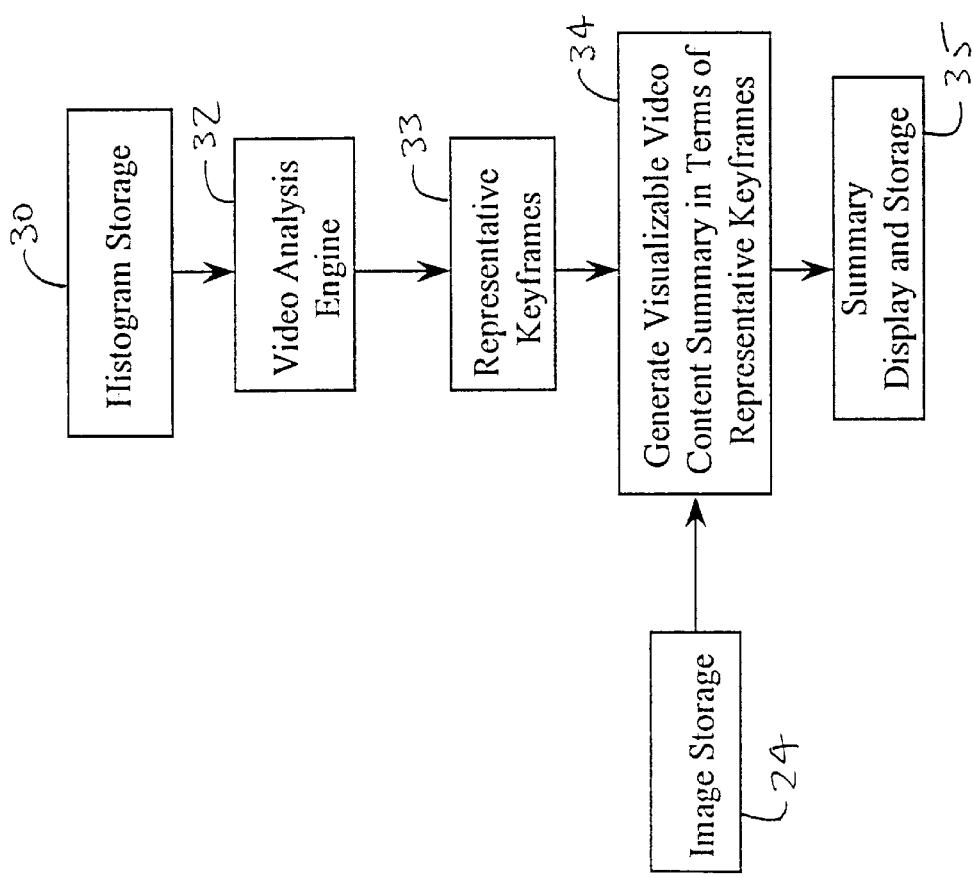
FIG. 4 is a block diagram of a system constructed according to the invention.

A video capturing device employing on-line histogram computation may generate a video summary upon a user's request. Camera 14, and now referring to FIG. 4, may include a video analysis engine 32, which identifies the representative keyframes 33 from stored histograms 30, for example, using the method proposed by Lagendijk et al. Frames corresponding to the keyframe of the summary are then selected from image storage mechanism 24 to generate the video content summary, which may be visualized. The video content summary may be displayed by a display 35, and/or stored in the camera, on tape, on a hard drive, etc. Alternatively, camera 14 may be switched to a "record summary mode," where only the summary images are maintained by the camera, and where summary keyframes are identified on-line using the on-line computed histogram information. This may be a preferable mode for a camera with limited storage, or for one that is connected to a low-bandwidth channel.

The invention may also be implemented by utilizing appropriate hardware/firmware in a digital camera to compute the histograms. The color histogram data may be compressed in the camera using standard lossless compression methods for efficient storage, if desired. Another major step required is a simple mechanism for linking the histogram data with their associated frames. This is required if histograms are stored separate from the image data, i.e., in a histogram file. Separate storage of histograms provides fast access to them. Such a link may be achieved in many different ways, for example by appending an identifier to each histogram to reference to its associated image. In a DVC compliant camera, for example, color histograms may be stored in the "memory-in-cassette" (MIC), or on the tape itself, as auxiliary data.

Figure 5:
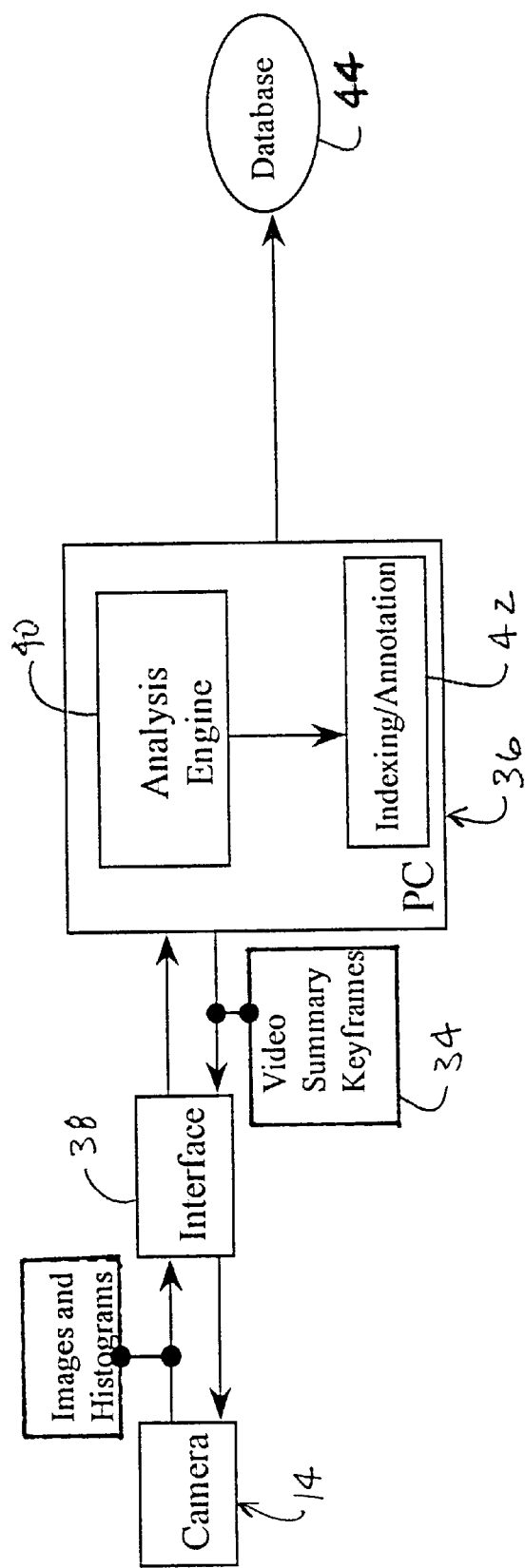
FIG. 5 is a variation of the system of the invention.

A video camera constructed according to the invention may be connected to a host platform, such as a PC, as shown at 36 in FIG. 5, which is also referred to herein as a peripheral processing mechanism. Camera 14 is connected to PC 36 by means of an interface 38, which is operable to transfer image data, histogram data and video content summary data, as directed by the user. PC 36 also includes a video analysis engine 40, similar to that used in camera 14, which provides for database indexing, block 42, and the generation of a database 44. The software application accesses the histogram data directly, without accessing images, to analyze the video. A "quick summary" may be computed using the histograms and visually presented to the user by downloading the keyframes contained in the summary. The user may then choose to view the video clip represented by a certain keyframe in the summary (i.e., video frames between two successive keyframes), or start annotating the summary frames for storage in a database. The user may also transfer the video summary to the camera for storage. Interface 38 may take the form of a fast wireless or wired link, such as a serial link, e.g., IEEE 1394 connection. In such a system, video analysis computation may be performed on the PC and the keyframes and video may be downloaded to the PC platform.

The video analysis engines described herein implement a tool for histogram based video summarization. This may be performed in the camera provided that the summarization engine, as proposed by Lagendijk, et al., is implemented in the camera. The other possibility is to perform the analysis on a PC platform that may be interfaced with the camera, as depicted in the following diagram. It is assumed that a mapping mechanism is used to keep track of the identity of the histograms, i.e., which histogram belongs to which image.

Analysis may be performed on a PC, rather than on the camera. If the analysis task is generation of a video content summary, the summary may be stored back in the camera as shown in FIG. 5. The video may be indexed on the basis of its summary keyframes and stored in a database. The keyframes may be used for annotating the video for storage in database 44.

The color histograms are also valuable in their own right, in addition to their utility as tools for video summarization. Color is a widely used feature for content-based representation of images and video frames, and a color histogram is a commonly used descriptor for color. Hence, the available histograms may be directly utilized in color-based indexing of images in a content-based database application.

The present invention may be extended to on-line computation and storage of image feature descriptors other than color histograms. Histograms, or other feature descriptors, may be used so long as the use of such feature descriptors does not hinder normal camera operation and so long as the camera contains adequate computational power. Histograms of appropriate transform coefficients may be computed in a camera that employs transform-based compression. For instance, histograms of DC coefficients of DCT are commonly used for video analysis. Alternately, functions of histograms, e.g., sample statistics of histograms, may be computed.

In a single sensor color camera, histograms may be directly computed from a sparse set of color values, resulting from a color filter array. In the case of a monochrome sensor, a gray-level histogram may be computed and stored.

Although a preferred embodiment of the invention, and a variation thereof, have been disclosed, it should be appreciated that further variations and modifications may be made thereto without departing from the scope of the invention as defined in the appended claims. Particularly, the system and method are applicable to both video cameras and still cameras.

I claim:

1. An image acquisition system, comprising:
   an image sensor for sensing an image and generating an image signal therefor;
   a histogram computation mechanism for generating, on-line, a computed histogram from said image signal;
   a storage mechanism for storing said image signal and said computed histogram in a database; and,
   a linking mechanism, including a look-up table, for linking said image signal and said computed histogram associated therewith.

2. The system of claim 1 wherein said storage mechanism is taken from the group of storage devices consisting of solid state memory, memory in the image acquisition device, memory-in-cassette, magnetic storage media and optical storage media.

3. The system of claim 1 which includes an image processing mechanism.

4. The system of claim 3, which further includes a video analysis engine for generating a video content summary.

5. The system of claim 1 wherein said histogram computation mechanism computes full-scale histograms.

6. The system of claim 1 wherein said histogram computation mechanism computes sample statistics of histograms.

7. The system of claim 1 wherein said histogram computation mechanism computes histograms of block transform coefficients.

8. The system of claim 1 which includes a peripheral processing mechanism and an interface between the peripheral processing mechanism and the image sensor.

9. The system of claim 8 wherein said peripheral processing mechanism includes a video analysis engine.

10. The system of claim 8 wherein said peripheral processing mechanism interfaces with a database.

11. A image acquisition device, comprising:
    an image sensor for sensing an image and generating an image signal therefor;
    an image processing mechanism for processing said image signal;
    an image storage mechanism for storing said processed image signal in a database;
    a histogram computation mechanism for generating, on-line, a computed histogram from said image signal;
    a histogram storage mechanism for storing said computed histograms in a database; and
    a linking mechanism, including a look-up table for linking said processed image signal and said computed histogram associated therewith.

12. The system of claim 11 wherein said image storage mechanism and said histogram storage mechanism are taken from the group of storage devices consisting of solid state memory, memory in the image acquisition device, memory-in-cassette, magnetic storage media and optical storage media.

13. The system of claim 11 which further includes a video analysis engine for generating a video content summary.

14. The system of claim 11 wherein said histogram computation mechanism computes full-scale histograms.

15. The system of claim 11 wherein said histogram computation mechanism computes sample statistics of histograms.

16. The system of claim 11 wherein said histogram computation mechanism computes histograms of block transfer coefficients.

17. The system of claim 11 which includes a peripheral processing mechanism and an interface between the peripheral processing mechanism and the image sensor.

18. The system of claim 17 wherein said peripheral processing mechanism includes a video analysis engine.

19. A method of analyzing a video image, comprising:
    sensing an image;
    generating an image signal therefor;
    computing, on-line, a computed histogram for the image from the image signal;
    forming a link using a look-up table for linking the computed histogram with an associated image signal; and
    storing, the image signal, the computed histogram and the link in a database.

20. The method of claim 19 which includes processing the image signal simultaneously with said computing to form a processed image signal and wherein said forming a link is taken from the group of link forming methods consisting of storing the image signal and the computed histogram associated therewith in a single file; storing the link to the computed histogram in the image signal and storing the link to the image signal in the computed histogram.

21. The method of claim 20 which includes analyzing the video content using the computed histogram to form a video content summary composed of representative keyframes.

22. The method of claim which includes analyzing the video content using the computed histogram to index the video for storage in a database.

23. The system of claim 1 wherein said linking mechanism includes a file which contains said image signal and said computed histogram.

24. The device of claim 11 wherein said linking mechanism includes a file which contains said processed image signal and said computed histogram.

25. The system of claim 1 wherein said linking mechanism is taken from the group of linking mechanisms consisting of a file which contains said image signal and said computed histogram; a link to said computed histogram in the stored image signal and a link to the stored image in said computed histogram.

26. The device of claim 11 wherein said linking mechanism is taken from the group of linking mechanisms consisting of a file which contains said processed image signal and said computed histogram; a link to said computed histogram in the stored image signal and a link to the stored image in said computed histogram.

* * * * *